(12) United States Patent
Genova

(10) Patent No.: US 9,009,929 B2
(45) Date of Patent: Apr. 21, 2015

(54) QUICK RELEASE HORSE LEAD CLIP ASSEMBLY

(71) Applicant: Ken Genova, Newberg, OK (US)

(72) Inventor: Ken Genova, Newberg, OK (US)

(*) Notice: Subject to any disclaimer, the term of this patent is extended or adjusted under 35 U.S.C. 154(b) by 0 days.

(21) Appl. No.: 14/083,488

(22) Filed: Nov. 19, 2013

(65) Prior Publication Data

US 2014/0143986 A1    May 29, 2014

Related U.S. Application Data

(60) Provisional application No. 61/730,326, filed on Nov. 27, 2012.

(51) Int. Cl.
| | |
|---|---|
| *B68B 5/00* | (2006.01) |
| *A01K 27/00* | (2006.01) |
| *F16B 7/04* | (2006.01) |
| *F16B 21/16* | (2006.01) |
| *F16B 45/04* | (2006.01) |

(52) U.S. Cl.
CPC ............... *B68B 5/00* (2013.01); *Y10T 24/3484* (2015.01); *A01K 27/005* (2013.01); *F16B 7/042* (2013.01); *F16B 21/165* (2013.01); *F16B 45/04* (2013.01)

(58) Field of Classification Search
CPC ............. Y10T 24/3484; A01K 27/005; A01K 27/006; A01K 27/003; F16G 11/10
USPC ......... 24/369, 599.1; 119/772, 795, 774, 776, 119/792
See application file for complete search history.

(56) References Cited

U.S. PATENT DOCUMENTS

| | | | | |
|---|---|---|---|---|
| 4,735,035 | A | | 4/1988 | Mattioli |
| 5,103,771 | A | * | 4/1992 | Lee ................................. 119/776 |
| 5,517,949 | A | | 5/1996 | Harris et al. |
| 6,308,662 | B1 | * | 10/2001 | Furman ......................... 119/776 |
| 6,318,301 | B1 | | 11/2001 | Jackson et al. |
| 6,530,345 | B2 | * | 3/2003 | Donze ........................... 119/774 |
| 6,629,511 | B2 | * | 10/2003 | De Bien ........................ 119/776 |
| 6,955,138 | B2 | * | 10/2005 | DeBien ......................... 119/776 |
| 7,162,978 | B2 | * | 1/2007 | Debien ......................... 119/772 |
| 7,389,750 | B1 | * | 6/2008 | Rogers et al. ................. 119/792 |
| 7,640,639 | B2 | * | 1/2010 | de Bien ............................. 24/615 |
| 2001/0037774 | A1 | * | 11/2001 | De Bien ........................ 119/776 |
| 2007/0163518 | A1 | | 7/2007 | Motsenbocker |
| 2007/0214616 | A1 | | 9/2007 | Peterson |

* cited by examiner

*Primary Examiner* — Robert J Sandy
*Assistant Examiner* — Rowland Do
(74) *Attorney, Agent, or Firm* — Daniel Boudwin; Global Intellectual Property Agency LLC

(57) ABSTRACT

A horse lead clip assembly for connection between horse tack that includes an upper clasp section with a hook and bolt closure and a lower quick detachable end that allows for the replacement of a broken clip with a new clip portion when excess stress is placed upon the hook of the clasping section. The assembly further includes a sleeve that when actuated laterally, allows for the introduction or removal of a new clasp section from the receiving end of the detachable portion. The assembly provides easy replacement of a broken clip, prevents the user from discarding the rope due to the broken clip, and allows a user to leave the clip hooked on one object while detaching it from the other.

6 Claims, 5 Drawing Sheets

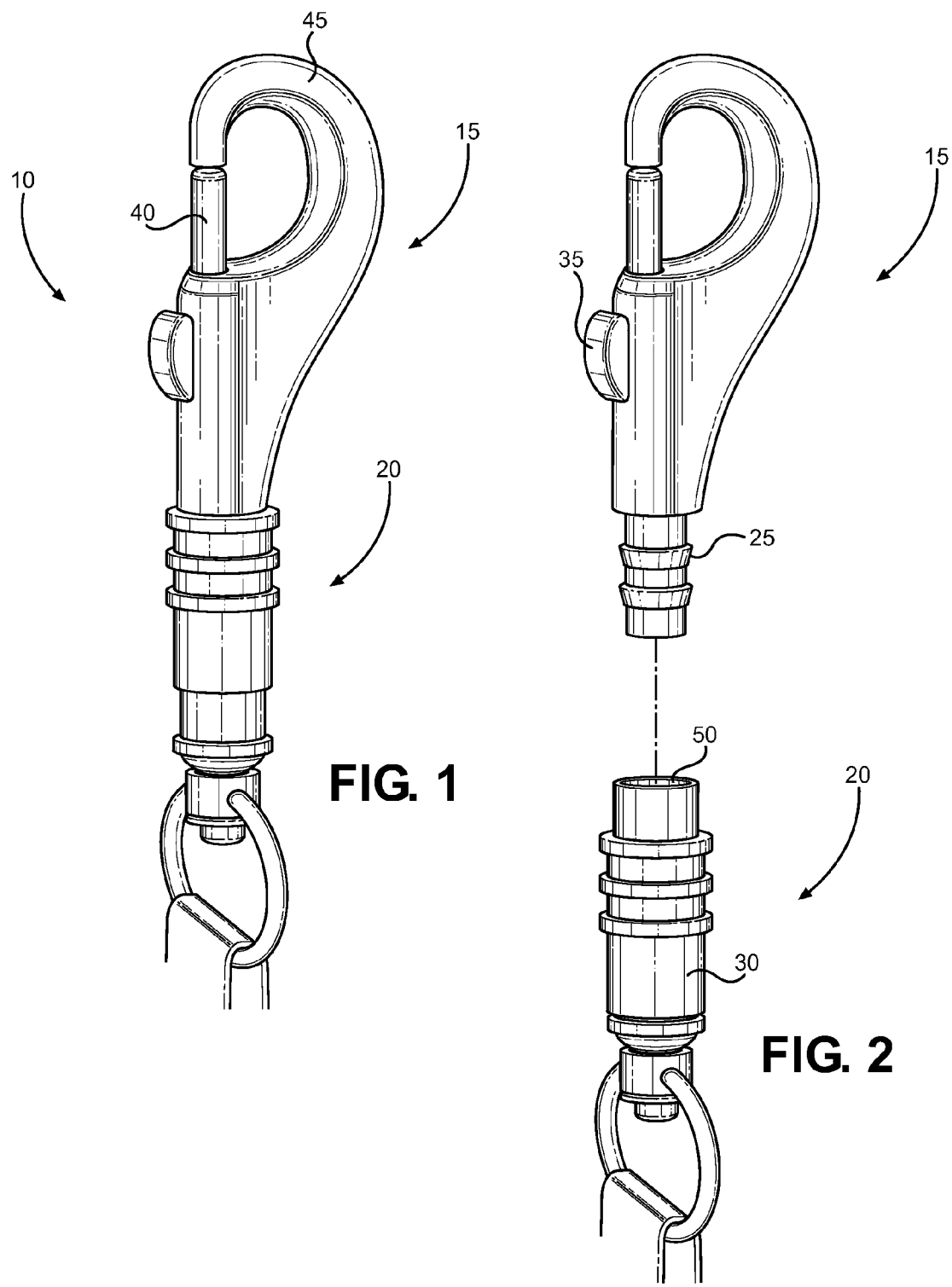

QUICK RELEASE HORSE LEAD CLIP ASSEMBLY

CROSS REFERENCE TO RELATED APPLICATION

This application claims the benefit of U.S. Provisional Application No. 61/730,326 filed on Nov. 27, 2012, entitled "Easy Clip." The above identified patent application is herein incorporated by reference in its entirety to provide continuity of disclosure.

BACKGROUND OF THE INVENTION

1. Field of the Invention

The present invention relates to a horse lead clip assembly. More specifically the invention pertains to a clip body comprising a quick release mechanism.

Horse lead clips are used to attach a halter to a lead rope and comprise a rope attachment ring on its distal end and a hooked end that is closed by a bolt snap gate at a proximal end. When attempting to train, administer vaccines, or restrain a horse, the animal may sense danger and attempt to escape by suddenly pulling back. Lead clips are designed to be durable, but when the horse makes sudden movements, often the first piece of equipment to break is the hook portion of the horse lead clip. This is a common occurrence for owners of large animals and often results in the animal running lose with a potential to cause injury to itself or others. When this happens the owner has to replace the entire device.

There are several horse lead clip assemblies in the prior art that attempt to provide suitable lead rope attachments to a halter ring. The attachments are adapted to provide a stable connection or designed to be frangible after the clip is stressed beyond a maximum amount. The drawback of these systems is that either the clip or lead rope has to be replaced after breakage, or the attaching clip separates apart too easily. The use of these systems can be problematic in that replacement of the clips becomes costly after repeated breakings and are not durable enough to withstand normal stresses before separation.

A further drawback of most horse tack clips is that existing clip attachments fail to provide replacement parts for events where the hook of the clasping portion of the horse lead clip becomes damaged. The use of those clips is problematic because the only solution is to replace the entire part. What is desired is a stable attachment system that provides an owner with additional parts to replace the fastener of a bolt snap hook when broken under an exceeding amount of stress.

There are several prior art devices that provide clip assemblies for connection of a horse lead rope to a horse halter; however none of the prior art devices address the need for providing replacement portions of the assembly without requiring the user to purchase a new attachment.

The present invention relates to a new and improved horse lead clip assembly designed for the connection of horse tack. Specifically the clip assembly comprises an upper clasping portion configured to be attached to a halter tie ring and a lower quick detachable portion configured to be secured to a horse lead rope. This design provides the same stability that standard bolt snap hooks of the prior art provide, while permitting the clasping portion of the assembly to be replaced when the hook of the clasp becomes damaged as a result of exceeding forces.

2. Description of the Prior Art

Devices have been disclosed in the prior art that relate to bolt snap hooks. These include devices that have been patented and published in patent application publications. These devices generally relate to connectors between a horse halter and lead rope that fail to address issues that arise when the connector is placed under excessive loads. The following is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 4,742,605 to Ritacco describes a safety release device for use when horses are tethered. When a sufficient force is exerted on the shaft, the spring compresses allowing the trigger to release the sections of the device. Although the Ritacco safety device is similar in nature and relevant to the present invention, it differs in that the present invention is designed to be replaceable in the event of a breakage instead of being designed to be frangible.

U.S. Pat. No. 5,517,949 to Harris describes an animal leash with a snap link appropriate as a lead for large animals such as horses. The snap link may be removed if the lead strap should be come damaged and a new lead can be substituted. The Harris leash, while similar in nature i relevant to the present invention, the leash of Harris differs in that it fails to provide a replacement section on the clip in the event of a breakage.

U.S. Pat. No. 5,548,875 to Hart discloses a safety snap for restraining livestock. The safety snap is placed between the halter and a lead rope and becomes separable upon application of a preselected force. Application of the selected force causes a shear pin breakage, thus unlatching the safety snap to release the lead rope. While similar in nature and relevant to the present invention, the safety snap of Hart differs from that of the present invention in that it fails to provide a replacement section on the clip in the event that the fastening hook becomes damaged.

U.S. Pat. No. 6,318,301 to Jackson describes a lead rope with multiple hooks that can be affixed to a headpiece of a horse and to an object. One hook is a break-away type, wherein if the horse applies sufficient pressure, the hook will detach and remain attached to the object to which it was clipped. While similar in nature and relevant to the present invention, the hook of Jackson differs from that of the present invention in that it fails to provide a replacement section in the event of a breakage.

U.S. Patent Publication No. 2007/0163518 to Motsenbocker describes a horse lead system comprising a connectors coupled to first and second loops. The breaking strength of the connectors vary based on the material from which it is manufactured and include three types of failure resistance in response to a sharp pull on the lead, in response to sustained tension on the lead, and in response to a twisting pressure. Although the Motsenbocker horse lead system is similar in nature and relevant to the present invention, it differs in that it fails to provide replacement portions of the coupler in the event of a breakage.

U.S. Patent Publication No. 2007/0214616 to Peterson teaches an adjustable length rope clip designed to permit a predetermined length of rope to be released when pressure is applied as a result of a horse being tied up and pulling on the rope. The rope clip is designed to prevent clip breakage by slowly releasing and extending the length of rope in the event the horse gets frightened. While the adjustable length rope clip of Peterson is similar in nature and relevant to the present invention, it differs in that there is not provided a solution for replacement of the clip when a breakage does occur.

The present invention relates to a horse lead clip assembly designed to connect a horse lead rope to a halter. The lead clip assembly comprises a male clasp portion connectable to a quick detachable base. The quick detachable portion comprises a mechanism that allows for separation and reattachment with a new clasping portion in situations where a horse or other large animal pulls away on a lead rope and breaks the clasp hook. The quick detach mechanism enables the owner of the horse lead attachment clip to save money by allowing the clasping portion of the clip to be replaced instead of requiring the owner to purchase an entire new attachment clip when the hook of the clip becomes damaged. The assembly provides easy replacement of a broken clip, prevents the user from discarding the rope due to the broken clip, and allows a user to leave the clip hooked on one object while detaching it from the other.

In view of the aforementioned drawbacks of the prior art, it is shown that the present invention is substantially divergent in design elements from the prior art and consequently it is clear that there is a need in the art for an improvement to existing lead rope connecting clip attachment devices. In this regard the instant invention substantially fulfills these needs.

SUMMARY OF THE INVENTION

In view of the foregoing disadvantages inherent in the known types of bolt snap hook attachment clips now present in the prior art, the present invention provides a new separable bolt snap hook wherein the same can be utilized for providing convenience for the user when the clip needs replacing after the clasp becomes damaged following an overstress and failure condition.

It is therefore an object of the present invention to provide a new and horse lead clip assembly that has all of the advantages of the prior art and none of the disadvantages.

It is another object of the present invention to provide a horse lead clip assembly that removably connects portions of horse tack for horse control by the user.

Another object of the present invention is to provide a clip assembly that comprises an upper clasp portion and a lower detachable base portion.

Another object of the present invention is to provide a horse lead clip assembly that comprises a quick detach mechanism.

Yet another object of the present invention is to provide a horse lead clip assembly that allows for quick disconnection of the hook base to allow for replacement of a clasp when the hook becomes damaged.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a perspective view of the present invention.

FIG. 2 shows an exploded perspective view of the removable connection between the base of the clasp and the slide coupler mechanism.

DETAILED DESCRIPTION OF THE INVENTION

Figure 3:
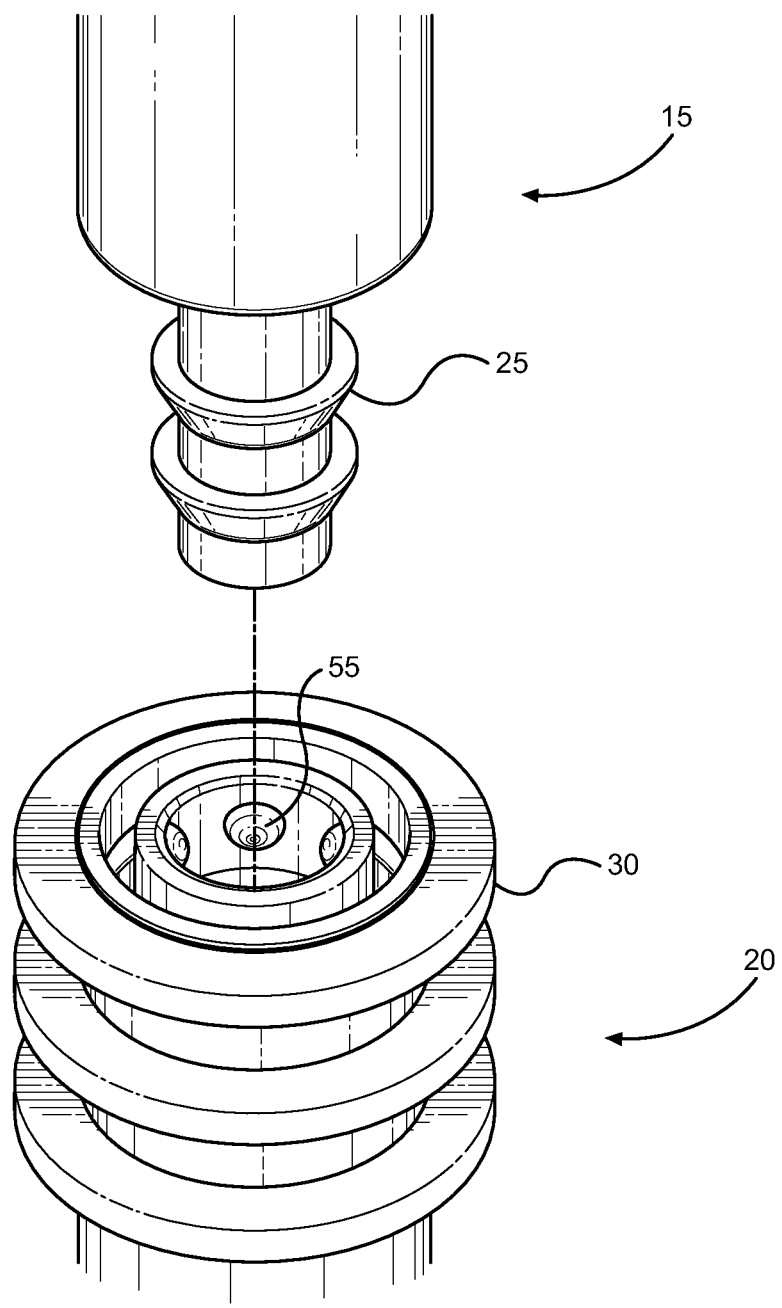
FIG. 3 shows a view of the connection between the clasp ridges of the clasp base and the slide coupler mechanism.

Reference is made herein to the attached drawings. Like reference numerals are used throughout the drawings to depict like or similar elements of a horse lead clip assembly. For the purposes of presenting a brief and clear description of the present invention, the preferred embodiment will be discussed as used for a separable horse lead clip assembly that comprises an upper portion for clipping onto a halter, and a lower portion configured to attach to a horse lead rope; wherein the upper and lower portions of the clip assembly are detachable from each other by the sliding of a locking sleeve mechanism. The figures are intended for representative purposes only and should not be considered to be limiting in any respect.

Referring to FIG. 1, there is shown a perspective view of the horse lead clip assembly 10 of the present invention. The lead clip assembly 10 comprises an upper clasping portion 15 for connection to a halter and a lower quick detaching section 20 for connection to a horse lead rope.

The clasping portion 15 comprises a closure mechanism in the form of a bolt snap gate 40 at its proximal end that provides a hook 45 closure. An actuator 35 slides with respect to the hook 45 and controls the movement of the gate 40 between an open to closed state. The actuator 35 and gate 40 are connected to one another within the hook body and are spring biased such that the gate 40 default position is in the closed state (as shown in FIG. 1). The clasping portion 15 further comprises a base member 25 that connects to an open receiving end 50 of the quick releasing section 20.

Referring to FIGS. 2-4, there are shown views of the connection between the upper clasping portion 15 and the lower quick detachable portion 20. FIG. 2 displays the base member 25 of the clasping portion 15 configured to be inserted within the receiving end 50 of the quick releasing section 20. The quick releasing portion 20 comprises a spring 65, a series of ball bearings 55, and a proximally biased sleeve 30 that comprises a ledge 70 and a pocket 60.

The quick releasing portion 20 seals to the clasping portion 15 when moved over the base member ridges 25 of the clasping portion 15, and secures thereover. Actuation of the sleeve 30 in a distal direction, against the spring bias, causes the sleeve 30 to release ball bearings 55 out of the receiving area 50, thus allowing the clasping section 15 to be removed from the receiving end 50. Actuation of the sleeve 30 in a proximal direction relative to the quick releasing section 20 causes the sleeve 30 to contact a series of ball bearings 55, push the ball bearings 55 outward and into an area of the receiving end 50, and locks the bearings against the clasp base member 25 to secure the portions of the assembly together.

Figure 4A:
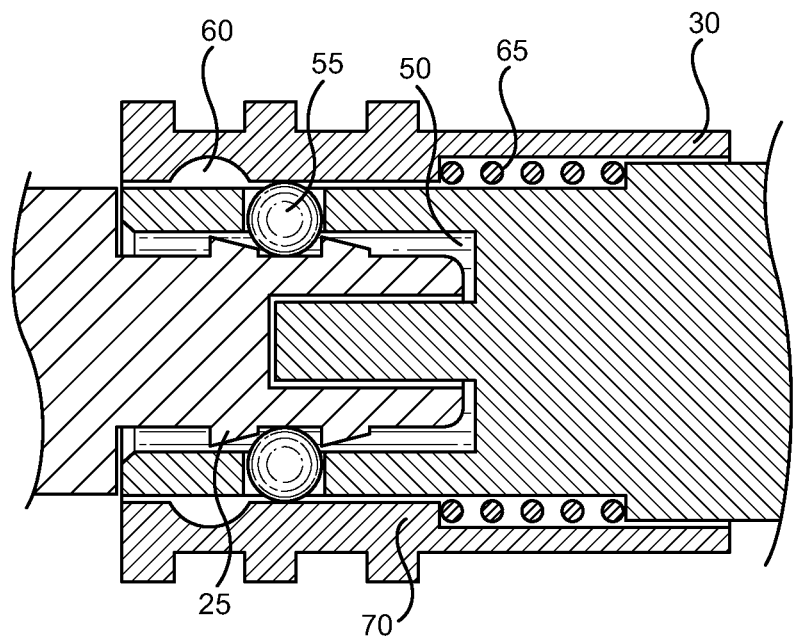
FIG. 4A shows a cross section view of the securing mechanisms of the assembly, wherein the clasp base is secured within the slide coupler mechanism.

Referring to FIG. 4A, there is shown a view of the base member ridges 25 of the clasping end 15 secured to the receiving end 50. When fully inserted within the receiving end 50, ball bearings 55 are pushed outward by a ledge 70 of the sleeve 30. This causes the ball bearings 55 to become secured within the ridges 25 of the clasping end 15. The sleeve 30 is biased proximally by a spring 65 within the quick detachable end 20 and keeps the sleeve 30 in a proximal direction to secure the clasping end 15 to the receiving end 50 until distal actuation of the sleeve 30.

In order for the base member 25 of the clasping end 15 to be inserted into the receiving end 50, the sleeve 30 of the quick detaching end 20 must first be moved distally in relation to the receiver 20. Distal actuation of the sleeve 30 compresses the spring 65. When actuated, the ledge 70 of the sleeve 30 moves across the series of ball bearings 55 of the quick detachable portion 20. Further actuation of the sleeve 30 causes the ledge 70 to translate across the ball bearings 55 until the bearings meet a pocket 60 within the ledge 70. At the conclusion of the movement of the ledge 70 across the ball bearings 55, the bearings 55 move outwardly into the pocket 65 and provide the increased area necessary for the inclusion of the base member ridges 25 of the clasping end 15.

The clasping end 15 is capable of being inserted into the receiving end 50 of the quick detachable end 20 when the sleeve 30 is fully retracted. Once the clasping end 15 is fully inserted into the quick release end 20, the sleeve 30 is released and the spring 65 causes the sleeve 30 to return to its proximal position. This movement causes the pocket 60 of the sleeve 30 to move across the ball bearings 55 and push the bearings 55 forward and into the ridges of the base member 25 of the clasping end 15. The sleeve 30 continues to actuate proximally under the force of the spring 65 and the ledge 70 proceeds to translate across the ball bearings 55 of the quick release lock 20 of the sleeve 30 until the sleeve 30 reaches its proximally biased position. When the series of balls 55 are in contact with the trough of the ridge 25, the two sections are secured together.

Figure 4B:
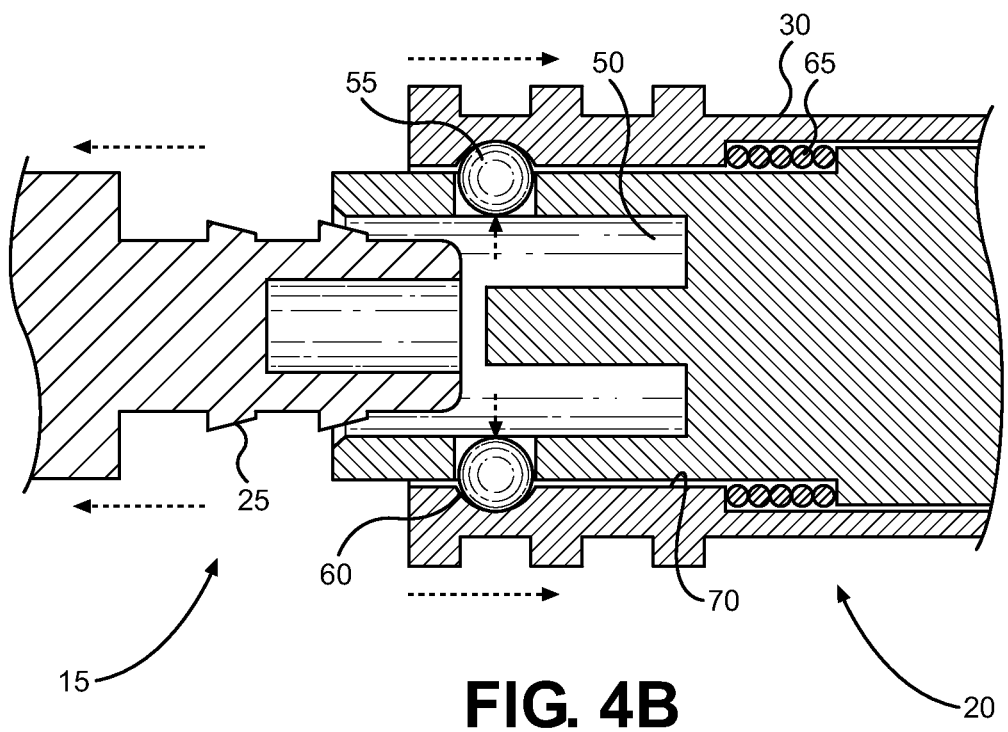
FIG. 4B shows a cross section view of the securing mechanisms of the assembly in the action of separating the slide coupler from the clasp base.

FIG. 4B details the separation of the clasping 15 and quick detaching ends 20. Separation of the two ends is achieved by distal movement of the sleeve 30 of the quick detachable end 20. The distal movement of the sleeve 30 causes the compression of the spring 65 of the quick detaching end 20. The ledge 70 of the sleeve 30 translates across the series of the ball bearings 55 until the ledge 70 no longer contacts the balls 55 and releases them into the pocket 60 of the sleeve 30. Once the bearings 55 are located within the pocket 60, they allow for the disconnection of the bearings 55 from the clasp ridges 25 and provide the additional area necessary for the separation of the ridges 25 from the receiving end 50 of the quick detaching end 20. When the ball bearings 55 are no longer in contact with the ridges 25, the clasping end 15 can be separated from the receiving end 50. In the event of a breakage of the clasping hook 45, separation of the sides is accomplished by sliding the sleeve 30 distally and removing the clasping portion 15 so that a replacement clasp can then be inserted.

Figure 5:
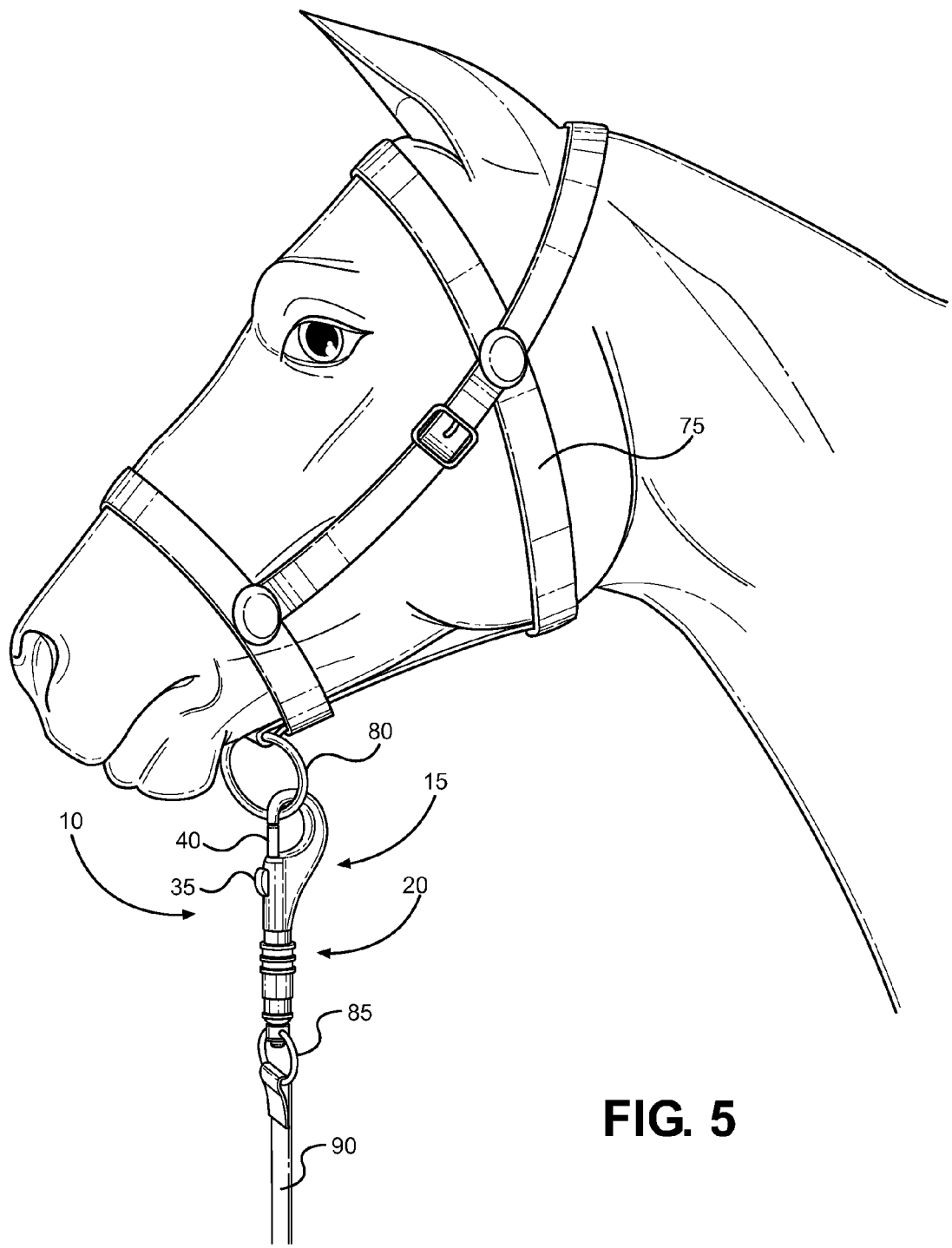
FIG. 5 shows a perspective view of the present invention in use in a coupled configuration.

Referring to FIG. 5, there is shown a view of the bolt snap hook assembly 10 while in use. The bolt snap hook assembly 10 is shown comprising its upper clasping 15 end attached to a horse halter and lower detachable end 20 attached to a horse lead rope. For attachment to the horse halter 75, the clasp gate 40 is lowered by the sliding of the gate actuator downward 35 and then placed around the halter tie ring 80. The actuator 35 is then released and the gate 40 resumes its proximal position under a spring force. At the opposite end of the bolt snap hook assembly 10, the distal end of the quick release mechanism comprises a ring 85 for attachment of a horse lead rope 90.

Figure 6:
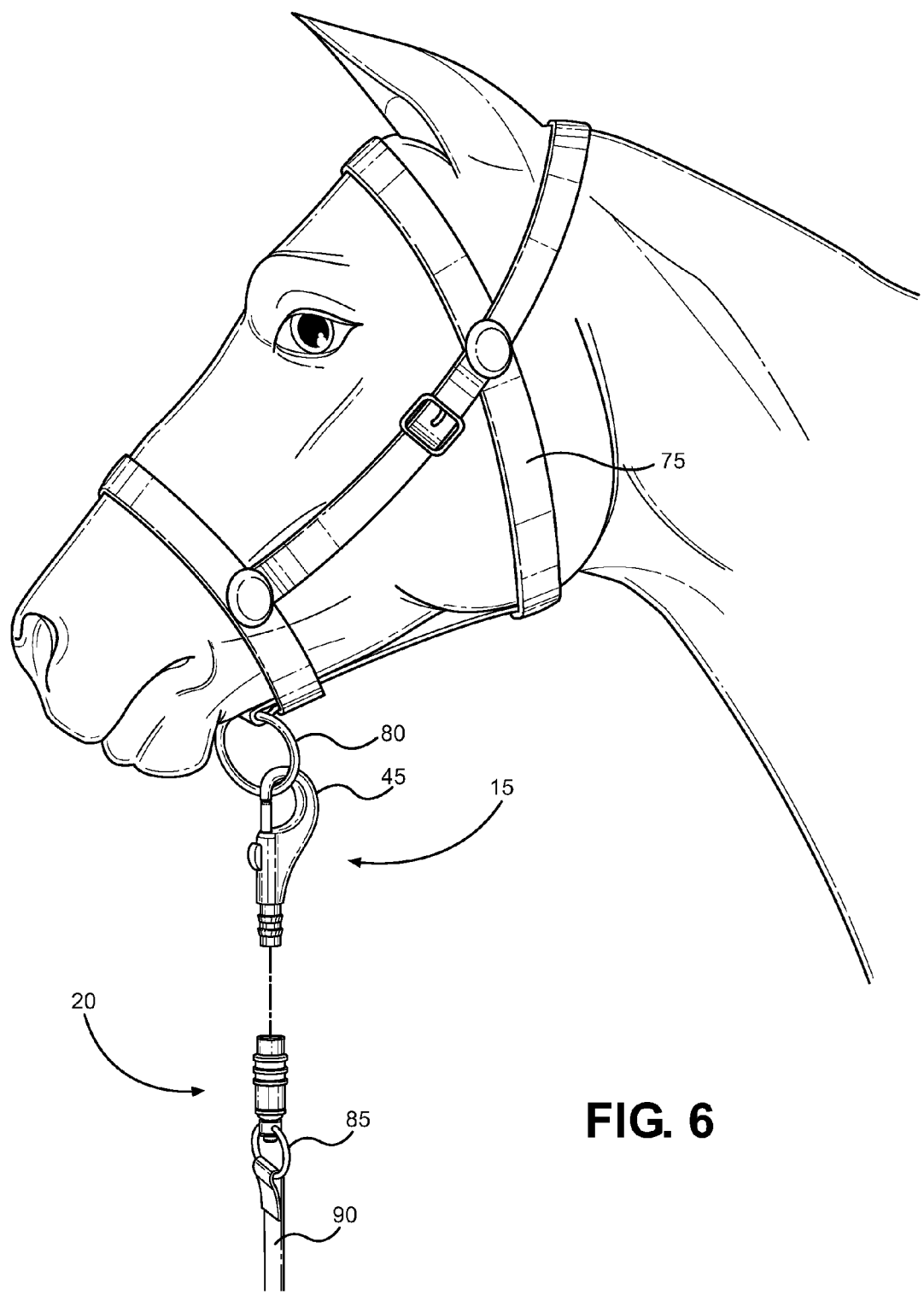
FIG. 6 shows a perspective view of the present invention being separated.

Referring to FIG. 6, there is shown a view of the bolt snap hook assembly 10, wherein the upper clasping end 15 is separated from the lower detachable end 20. In the event that a horse or large animal senses danger and damages the clasping hook 45, it may be necessary to replace the clasping section 15. The damaged section is removed by distally moving the quick release sleeve 30 relative to the quick release section 20. The ledge 70 of the sleeve 30 is moved across the series of balls 55 until it no longer contacts the balls and the ball bearings 55 are separated from the ridges 25 of the clasping end 15 and released into the pocket 60 of the quick releasing end 20. Once the balls 55 are no longer in contact with the ridges 25, the clasping end 15 can be separated from the receiving end 50 and a new clasping end 15 with an undamaged hook 45 can be placed within the receiving end 50.

When the new clasping section 15 is inserted within the receiving end 50, the sleeve 30 is released by the user. The sleeve 30 is actuated proximally by force of the spring 65 and causes the ball bearings 55 to be forced out of the pocket 60 by the movement of the sleeve 30. The ledge 70 of the sleeve 30 forces the ball bearings 55 forward and into the of the receiving end 50, locking the ball bearings 55 within the trough of the ridges 25 and securing the two sections of the assembly together.

The present invention provides an improved assembly for attachment between horse tack. The horse lead clip assembly 10 comprises a clasping end 15 and a quick detaching portion 20 that enables a user to replace a portion of the connection assembly in the event that a portion of the assembly becomes damaged. The assembly further comprises ball bearings 55 that contact the base member ridges 25 of a clasping end 15 to secure the two pieces together. The device can be constructed of metal or another suitable material, and can further come in different sizes to suit a range of needs.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A detachable clip assembly, comprising:
   a clasping portion and a detachable portion;
   said clasping portion comprising an actuator, a hook and a bolt snap gate operatively connected to said actuator, and a base portion comprising one or more ridges;
   said detachable portion comprising an open receiving end comprising an interior surface, one or more ball bearings retractably disposed along said interior surface, a slidably disposed spring-biased sleeve, and one or more indentations disposed on said spring-biased sleeve;
   said one or more ridges comprising a leading edge and a trailing edge;
   said leading edge adapted to allow said one or more ridges to pass over said one or more ball bearings when said base portion is inserted into said open receiving end;
   said trailing edge adapted to prevent said base portion from being withdrawn from said open receiving end when engaged with said ball bearings;

wherein actuation of said spring-biased sleeve causes said indentations to align with said ball bearings, thereby causing said ball bearings to retract and disengage with said ridges of said base portion and allowing said base portion to be removed from said open interior.

2. The detachable clip assembly of claim 1, wherein the assembly is secured by proximal movement of the sleeve relative to the clasping portion.

3. The detachable clip assembly of claim 1, wherein the assembly is separated by distal movement of the sleeve relative to the clasping portion.

4. The detachable clip assembly of claim 1, wherein the distal end of the detachable portion comprises a ring adapted for attachment to a lead rope.

5. The detachable clip assembly of claim 1, wherein said leading edge is angled.

6. The detachable clip assembly of claim 1, wherein said open receiving end comprises a projection;
wherein said base portion further comprises a hollow middle portion adapted to accept said projection therein.

* * * * *